(No Model.)

J. ASHENFELTER.
SAW.

No. 245,114.　　　　　　　　Patented Aug. 2, 1881.

WITNESSES
Fred. G. Dieterich.
A. H. Krause.

Joseph Ashenfelter
INVENTOR
By his Attorneys
Louis Bagger & Co.

UNITED STATES PATENT OFFICE.

JOSEPH ASHENFELTER, OF BLUE SPRINGS, NEBRASKA.

SAW.

SPECIFICATION forming part of Letters Patent No. 245,114, dated August 2, 1881.

Application filed April 11, 1881. (No model.)

*To all whom it may concern:*

Be it known that I, JOSEPH ASHENFELTER, of Blue Springs, in the county of Gage and State of Nebraska, have invented certain new and useful Improvements in Saws; and I do hereby declare that the following is a full, clear, and exact description of the invention, which will enable others skilled in the art to which it appertains to make and use the same, reference being had to the accompanying drawings, which form a part of this specification, and in which—

Figure 1:
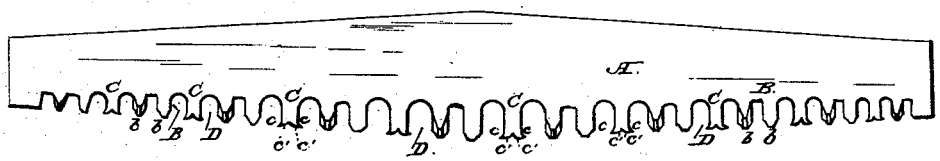
Figure 2:
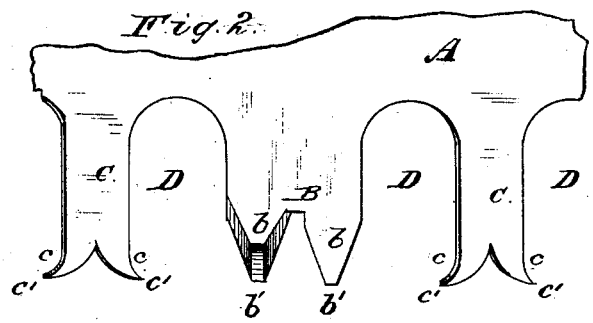

Figure 1 is a side view of my improved saw; and Fig. 2 is a perspective view of a broken-off section or portion of the same, on an enlarged scale, to show more clearly the detailed construction of the teeth.

Similar letters of reference indicate corresponding parts in both the figures.

My invention contemplates certain improvements in crosscut-saws, as hereinafter set forth, and particularly pointed out in the claim.

In the annexed drawings, A represents the body or blade of the saw.

B are the double-pointed "lance" teeth, the points $b\ b$ of which are cut off straight at their lower ends to form a sharp cutting-edge, $b'$. The two points $b$ of each main tooth B are beveled and sharpened on opposite sides, as shown more clearly in Fig. 2, and between each pair of lance or cutting teeth B is a "plow" tooth, C, the points $c\ c$ of which are curved in opposite directions and made with sharp horizontal cutting-edges $c'\ c'$. In other words, the cutting-edges $c'$ of the plow-teeth C are set at right angles to the straight horizontal cutting-points $b'$ of the lance-teeth B, both sets of points lying in the same horizontal plane.

I construct my saw with very wide throats D between the teeth, to afford ample space for the dust which is plowed up from the bottom of the kerf by the cutting-edges of the plow-teeth C. I make the throats in the middle of the blade about one inch in width, gradually reducing their width and capacity toward both ends to about half an inch, reducing the depth of the throats proportionately, as will clearly be seen by reference to Fig. 1 of the drawings.

The double-pointed lance-teeth B, with their flat or straight cutting-points, cut into the wood, instead of scraping or scratching it, making a kerf with smooth sides, from the bottom of which the curved points $c'$ of the intermediate teeth, C, plow up the dust in the form of long narrow shavings, which are curled up into the throats between the teeth, and are discharged at the end of each stroke.

I have found by actual experiment that this saw will do better and quicker work, with less labor, than any of the crosscut-saws with which I am acquainted, owing to the peculiar construction and arrangement of the teeth.

I am aware that the Patent No. 149,562, of April 14, 1874, granted to W. H. Bentley, in which a saw is shown having lance-teeth arranged in pairs alternately with double-pointed plow or clearing teeth with their points curved outward in opposite directions, and I do not, therefore, claim such construction or arrangement of the saw-teeth broadly; but by forming the lance teeth of my improved saw with straight or square cutting-edges $b'\ b'$, gradually increasing in thickness up to the thick part $b$ of the point, the tooth acts in the nature of a double-edged chisel, which cuts instead of scrapes or scores the kerf, or, rather, the sides of the kerf, the strip of wood thus formed in the kerf being plowed up by the horizontal plane-points $c'\ c'$ of the plow-teeth C. Hence

What I claim as my improvement, and desire to secure by Letters Patent of the United States, is—

A crosscut-saw, A, having double-pointed cutting-teeth B, the points $b$ of which have flat or square cutting-points $b'$, alternating with plow-teeth C, the points $c\ c$ of which are curved outward in opposite directions and sharpened to form horizontal cutting-edges $c'\ c'$, the cutting edges or points $b'\ c'$ of the teeth B C respectively lying in the same horizontal plane, but set at right angles to each other, as set forth.

In testimony that I claim the foregoing as my own I have hereto affixed my signature in presence of two witnesses.

JOSEPH ASHENFELTER.

Witnesses:
GRAWELL MADISON,
E. F. TOTTEN.